United States Patent
Tamashima et al.

(10) Patent No.: US 10,167,855 B2
(45) Date of Patent: Jan. 1, 2019

(54) PISTON INCLUDED IN LIQUID-PRESSURE ROTATING DEVICE AND LIQUID-PRESSURE ROTATING DEVICE

(71) Applicant: KAWASAKI JUKOGYO KABUSHIKI KAISHA, Kobe-shi, Hyogo (JP)

(72) Inventors: Hideki Tamashima, Himeji (JP); Toru Shiratsuchi, Akashi (JP); Kenta Otsuda, Fukuchiyama (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 60 days.

(21) Appl. No.: 14/787,124

(22) PCT Filed: Apr. 3, 2014

(86) PCT No.: PCT/JP2014/001941
§ 371 (c)(1),
(2) Date: Oct. 26, 2015

(87) PCT Pub. No.: WO2014/174776
PCT Pub. Date: Oct. 30, 2014

(65) Prior Publication Data
US 2016/0076524 A1    Mar. 17, 2016

(30) Foreign Application Priority Data
Apr. 26, 2013   (JP) .................. 2013-094307

(51) Int. Cl.
*F16J 1/00*   (2006.01)
*F04B 1/12*   (2006.01)
(Continued)

(52) U.S. Cl.
CPC .............. *F04B 1/124* (2013.01); *F01B 3/007* (2013.01); *F01B 3/0085* (2013.01);
(Continued)

(58) Field of Classification Search
CPC .......... F01B 3/0085; F16J 1/005; F16J 1/006; F16J 1/08; F04B 1/124; F04B 53/14
(Continued)

(56) References Cited

U.S. PATENT DOCUMENTS

| 3,319,575 A * | 5/1967 | Havens ................ F01B 3/0085 91/488 |
| 5,553,378 A * | 9/1996 | Parekh .................. B23P 15/10 29/888.042 |
| 2007/0125227 A1* | 6/2007 | Beck ...................... B23P 15/10 92/71 |

FOREIGN PATENT DOCUMENTS

| DE | 1920114 A1 * | 10/1970 | ............ F01B 3/0085 |
| DE | 3602651 A1 * | 7/1987 | ............ F01B 3/0085 |
(Continued)

OTHER PUBLICATIONS

Oct. 27, 2015 International Preliminary Report on Patentability issued in Patent Application No. PCT/JP2014/001941.
(Continued)

*Primary Examiner* — F. Daniel Lopez
*Assistant Examiner* — Matthew Wiblin
(74) *Attorney, Agent, or Firm* — Oliff PLC

(57) ABSTRACT

A piston in a liquid-pressure rotating device in which pistons are arranged at a cylinder block rotatable together with a rotating shaft, includes: a cylindrical peripheral wall main body portion including a hollow portion, an opening portion formed at one end of the body portion and communicating with the hollow portion; a lid portion welded to an inner peripheral surface of the opening portion sealing the hollow portion and including an outer surface formed as a pressure receiving surface which receives liquid pressure; and a stress reducing portion provided on an inner peripheral surface of the body portion, the inner peripheral surface in contact with or close to an end portion of a welded portion formed
(Continued)

between the opening portion and the lid portion, the end portion located at the hollow portion side, the stress reducing portion configured to reduce stress acting on the end portion of the welded portion.

8 Claims, 15 Drawing Sheets

(51) Int. Cl.
    *F04B 1/04*      (2006.01)
    *F04B 53/14*      (2006.01)
    *F01B 3/00*      (2006.01)
    *F04B 1/20*      (2006.01)

(52) U.S. Cl.
    CPC .......... *F04B 1/0408* (2013.01); *F04B 1/2078* (2013.01); *F04B 53/14* (2013.01); *F16J 1/005* (2013.01)

(58) Field of Classification Search
    USPC .......................................................... 92/158
    See application file for complete search history.

(56) References Cited

FOREIGN PATENT DOCUMENTS

| DE | 19620167 C1 | * | 3/1997 | .............. B23P 15/10 |
|----|-------------|---|--------|--------------------------|
| EP | 0952339 A2 |   | 10/1999 | |
| EP | 1126168 A2 |   | 8/2001 | |
| EP | 1143143 A2 |   | 10/2001 | |
| JP | S10-122130 A |  | 5/1998 | |
| JP | 2001-263240 A | | 9/2001 | |
| JP | 2008-175121 A | | 7/2008 | |

OTHER PUBLICATIONS

Jun. 24, 2014 International Search Report issued in Patent Application No. PCT/JP2014/001941.

Nov. 17, 2016 Extended Search Report issued in European Patent Application No. 14788394.6.

* cited by examiner

— Prior Art—

— Prior Art —

PISTON INCLUDED IN LIQUID-PRESSURE ROTATING DEVICE AND LIQUID-PRESSURE ROTATING DEVICE

TECHNICAL FIELD

The present invention relates to a piston included in a liquid-pressure rotating device used as an axial piston motor or an axial piston pump, and the liquid-pressure rotating device.

BACKGROUND ART

One example of the axial piston motor or the axial piston pump is a liquid-pressure rotating device shown in FIG. 17. A liquid-pressure rotating device 1 is configured such that: pistons 10 are attached to respective piston chambers 9a of a cylinder block 9; and the pistons 10 rotate together with the cylinder block 9. At this time, the pistons 10 rotate along a swash plate 12 and also reciprocate. Thus, the volume of a space surrounded by the piston 10 and the piston chamber 9a changes. The liquid-pressure rotating device 1 configured as above serves as a motor or a pump. As performance of such a motor or pump, a maximum rotating speed and an energy conversion efficiency are important. The pistons 10 are important members which determine the performance of the motor or pump.

To rotate the liquid-pressure rotating device 1 at high speed, the weight of the piston 10 needs to be reduced. As shown in FIG. 17, the piston 10 including a hollow portion 10b is used.

According to the piston 10 including the hollow portion 10b, an operating liquid flows into the hollow portion 10b. Therefore, even when the piston 10 is located at a top dead center as shown in an upper side of FIG. 17, the volume (dead volume) of the space surrounded by the piston 10 and the piston chamber 9a becomes large. When suctioning or ejecting the operating liquid, a compression loss generated by compressibility of the operating liquid becomes large.

To realize the weight reduction and the small dead volume, a piston 48 shown in FIGS. 18 and 19 is used (see PTL 1, for example). As shown in FIG. 18, the piston 48 includes a peripheral wall main body portion 49 and a lid portion 50.

The peripheral wall main body portion 49 is a cylindrical member including the hollow portion 10b. An opening portion 51 which communicates with the hollow portion 10b is formed at one end of the peripheral wall main body portion 49.

The lid portion 50 is a circular plate-shaped member including a center hole 52. The lid portion 50 is welded to an inner peripheral surface of the opening portion 51, which is formed at one end of the peripheral wall main body portion 49, to seal the hollow portion 10b. An outer surface of the lid portion 50 is formed as a pressure receiving surface 50a.

As shown in FIG. 18, a tubular liquid passage portion 53 is formed at a position through which a center line of the piston 48 extends. The tubular liquid passage portion 53 causes outer surfaces of both end portions of the piston 48 to communicate with each other.

Since the piston 48 shown in FIG. 18 includes the hollow portion 10b, the weight reduction of the piston 48 can be realized. In addition, since the hollow portion 10b is sealed by the lid portion 50, the dead volume can be made small.

CITATION LIST

Patent Literature

PTL 1: U.S. Pat. No. 3,319,575

SUMMARY OF INVENTION

Technical Problem

According to the conventional piston 48, as shown in a partially enlarged sectional view of FIG. 19, a corner portion formed by an inner surface 50b of the lid portion 50 and an inner peripheral surface 49a of the peripheral wall main body portion 49 is a corner angle portion 54 having a substantially right angle. Therefore, stress concentrates on an end portion 55a of a welded portion 55 formed at the corner angle portion 54, the end portion 55a being located at the hollow portion 10b side. Thus, fatigue strength of the end portion 55a of the welded portion 55 deteriorates. As a result, the life of the piston 48 shortens.

It should be noted that the stress concentrating on the end portion 55a of the welded portion 55 is based on: stress generated by force acting on the pressure receiving surface 50a and outer peripheral surface 49b of the piston 48; and residual stress of the welded portion 55.

The present invention was made to solve the above problems, and an object of the present invention is to provide a piston included in a liquid-pressure rotating device and the liquid-pressure rotating device, in each of which a weight reduction of the piston can be realized, strength of the piston can be improved, and an energy conversion efficiency and maximum rotating speed of the liquid-pressure rotating device in which the piston is provided can be improved.

Solution to Problem

A piston included in a liquid-pressure rotating device according to the present invention is a piston included in a liquid-pressure rotating device in which a plurality of pistons including the piston are arranged at a cylinder block in a circumferential direction of the cylinder block, the cylinder block being configured to rotate together with a rotating shaft, the liquid-pressure rotating device being used as a pump or a motor, the piston including: a cylindrical peripheral wall main body portion including a hollow portion, an opening portion being formed at one end of the peripheral wall main body portion and communicating with the hollow portion; a lid portion welded to an inner peripheral surface of the opening portion to seal the hollow portion and including an outer surface formed as a pressure receiving surface which receives liquid pressure; and a stress reducing portion provided on an inner peripheral surface of the peripheral wall main body portion or an inner surface of the lid portion, the inner peripheral surface and the inner surface being in contact with or close to an end portion of a welded portion formed between the opening portion and the lid portion, the end portion being located at the hollow portion side, the stress reducing portion being configured to reduce stress acting on the end portion of the welded portion.

According to the piston of the present invention, the cylindrical peripheral wall main body portion constituting the piston includes the hollow portion. The hollow portion is sealed by the lid portion, so that the operating liquid does not flow into the hollow portion. Thus, the weight of the piston can be reduced.

Since the volume (dead volume) of the space surrounded by the piston and the piston chamber to which the piston is attached can be made small, a compression loss generated by compressibility of the operating liquid can be reduced.

Stress generated by force acting on the pressure receiving surface and outer peripheral surface of the piston and residual stress act on the welded portion formed between the opening portion of the peripheral wall main body portion and the lid portion. However, the stress reducing portion can reduce the stress acting on an end portion of the welded portion, the end portion being located at the hollow portion side and relatively low in strength. With this, fatigue strength of the end portion of the welded portion can be improved, and therefore, the strength of the piston can be increased.

The piston included in the liquid-pressure rotating device according to the present invention may be configured such that the stress reducing portion is an annular concave portion provided on the inner peripheral surface of the peripheral wall main body portion and having a cross section through which a center line of the peripheral wall main body portion extends, the cross section having an arbitrary shape including a circular-arc shape or a polygonal shape.

Since the stress reducing portion is formed as the annular concave portion, a portion where the inner surface of the lid portion and the inner peripheral surface of the stress reducing portion are coupled to each other can be formed as not a corner angle portion but a substantially flat portion. Therefore, the stress reducing portion can prevent the stress from concentrating on the end portion of the welded portion formed at the substantially flat portion, the end portion being located at the hollow portion side. In addition, since the stiffness of the hollow portion which restricts the welded portion at the time of the welding is reduced by the annular concave portion, the residual stress of the welded portion can be reduced. As a result, the fatigue strength of the end portion of the welded portion can be improved. With this, the life of the piston can be extended.

The piston included in the liquid-pressure rotating device according to the present invention may be configured such that the stress reducing portion is an annular thin portion projecting from an outer peripheral portion of the inner surface of the lid portion toward the hollow portion beyond the inner surface located at an inner side of the outer peripheral portion, the inner surface being located at the hollow portion side; and the welded portion is formed between an outer peripheral surface of the lid portion including the thin portion and the inner peripheral surface of the peripheral wall main body portion.

According to the stress reducing portion, when the pushing force acts on the outer surface of the peripheral wall main body portion, the welded portion is sandwiched between the inner peripheral surface of the peripheral wall main body portion and the outer peripheral surface of the thin portion of the lid portion to receive compressive force. However, the peripheral wall main body portion, the end portion of the welded portion, and the thin portion of the lid portion can bend in a radially inward direction by the pushing force. With this, the compressive force acting on the end portion of the welded portion can be reduced. Since the stiffness of the lid portion which restricts the welded portion at the time of the welding is reduced by the thin portion of the lid portion, the residual stress of the welded portion is reduced. As a result, the fatigue strength of the end portion of the welded portion can be improved. With this, the life of the piston can be extended.

The piston included in the liquid-pressure rotating device according to the present invention may be configured such that the thin portion as the stress reducing portion is formed by an annular concave portion provided on the inner surface of the lid portion and having a cross section through which a center line of the lid portion extends, the inner surface being located at the hollow portion side, the cross section having an arbitrary shape including a circular-arc shape or a polygonal shape.

By forming the thin portion as above, the thickness of the lid portion itself can be set to an appropriate size, so that the stiffness required for the lid portion can be secured.

The piston included in the liquid-pressure rotating device according to the present invention may further include an annular step portion projecting from the inner peripheral surface of the peripheral wall main body portion and opposing the end portion of the welded portion in a direction along a center line of the peripheral wall main body portion, the end portion being located at the hollow portion side, wherein an interval between the step portion and the end portion, which is located at the hollow portion side, of the welded portion is set such that when welding the lid portion to the opening portion, the end portion, which is located at the hollow portion side, of the welded portion is not coupled to the step portion through an extended welded portion.

With this, when welding the lid portion to the opening portion, the end portion of the welded portion can be prevented from being coupled to the step portion through the extended welded portion.

To be specific, in a case where the extended welded portion extends beyond a portion where the outer peripheral surface of the lid portion and the inner peripheral surface of the peripheral wall main body portion are fitted to each other, so as to be exposed at the hollow portion side of the peripheral wall main body portion, and the extended welded portion is coupled to the step portion, the extended welded portion becomes a cylindrical wall portion, and a corner portion formed by an inner peripheral surface of this cylindrical wall portion and the inner surface of the lid portion becomes the corner angle portion. With this, the stress concentrates on the end portion of the welded portion formed at the corner angle portion, and therefore, the fatigue strength of the end portion of the welded portion deteriorates.

In a case where the end portion of the welded portion is not coupled to the step portion, and for example, the extended welded portion is formed as not a cylindrical peripheral wall portion but an annular projection, a portion where the end portion of the welded portion is formed does not become the corner angle portion. Thus, the stress can be prevented from concentrating on the end portion.

As above, according to the present invention, the end portion of the welded portion can be prevented from being coupled to the step portion through the extended welded portion, so that the fatigue strength of the end portion of the welded portion can be prevented from deteriorating.

The piston included in the liquid-pressure rotating device according to the present invention may be configured such that a tubular liquid passage portion is provided at a position of the piston to cause outer surfaces of both end portions of the piston to communicate with each other, a center line of the piston extending through the position.

With this, the operating liquid at the pressure receiving surface side of the lid portion welded to one end portion of the piston can be guided to the outer surface of the other end portion of the piston through the liquid passage portion. With this, for example, a contact portion between the other end portion of the piston and the shoe swingably fitting to the other end portion of the piston is lubricated by the operating liquid. Thus, frictional resistance at the contact portion can be reduced.

The piston included in the liquid-pressure rotating device according to the present invention may further include a liquid passage portion provided such that an operating liquid contacts an inner surface of the peripheral wall main body portion, the liquid passage portion causing outer surfaces of both end portions of the piston to communicate with each other.

With this, as with the above, the frictional resistance between the other end portion of the piston and the shoe swingably fitting to the other end portion can be reduced by the operating liquid. Since the operating liquid flowing through the liquid passage portion contacts the inner surface of the peripheral wall main body portion, the operating oil can efficiently takes frictional heat generated by the sliding of the piston on the piston chamber. With this, cooling performance of a sliding surface (outer peripheral surface) of the piston sliding on the piston chamber can be improved, and the rotating speed of the liquid-pressure rotating device can be improved.

A liquid-pressure rotating device according to the present invention includes the piston according to the present invention, the liquid-pressure rotating device being used as a pump or a motor.

The liquid-pressure rotating device according to the present invention includes the piston according to the present invention, and the piston acts in the same manner as above.

Advantageous Effects of Invention

According to the piston of the present invention, the weight of the piston can be reduced by providing the hollow portion. In addition, since the operating liquid is prevented from flowing into the hollow portion, an energy conversion efficiency and maximum rotating speed of the liquid-pressure rotating device in which the piston is provided and which is used as a pump or a motor can be improved. Further, since the piston includes the stress reducing portion, the strength of the piston can be increased, so that the life of the piston can be extended.

The above object, other objects, features, and advantages of the present invention will be made clear by the following detailed explanation of preferred embodiments with reference to the attached drawings.

DESCRIPTION OF EMBODIMENTS

Hereinafter, Embodiment 1 regarding a piston included in a liquid-pressure rotating device and the liquid-pressure rotating device according to the present invention will be explained in reference to FIGS. 1 to 3 and 17. Pistons 61 of the present embodiment are attached to and used in the piston chambers 9a formed at the cylinder block 9 of the liquid-pressure rotating device 1 shown in FIG. 17.

Figure 17:
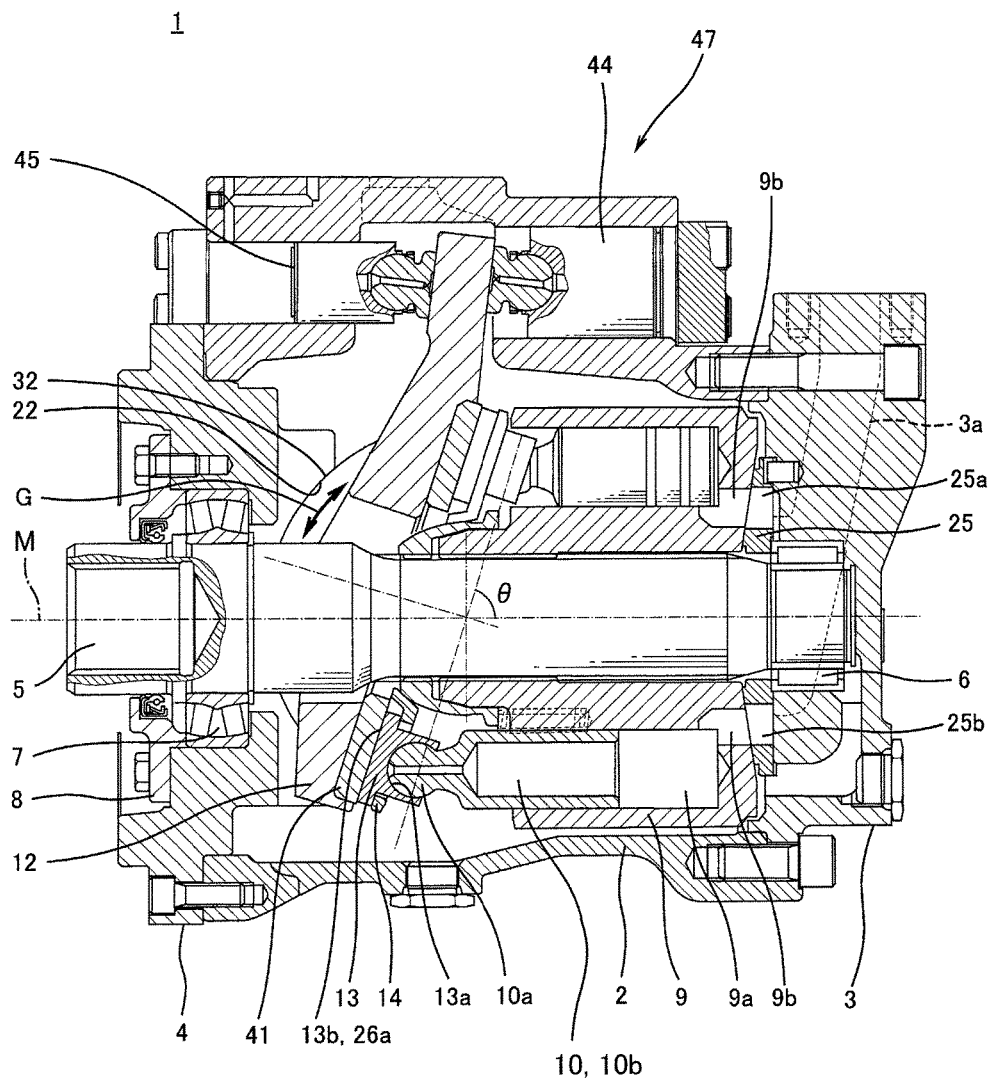
FIG. 17 is a longitudinal sectional view showing a conventional liquid-pressure rotating device.
Figure 18:
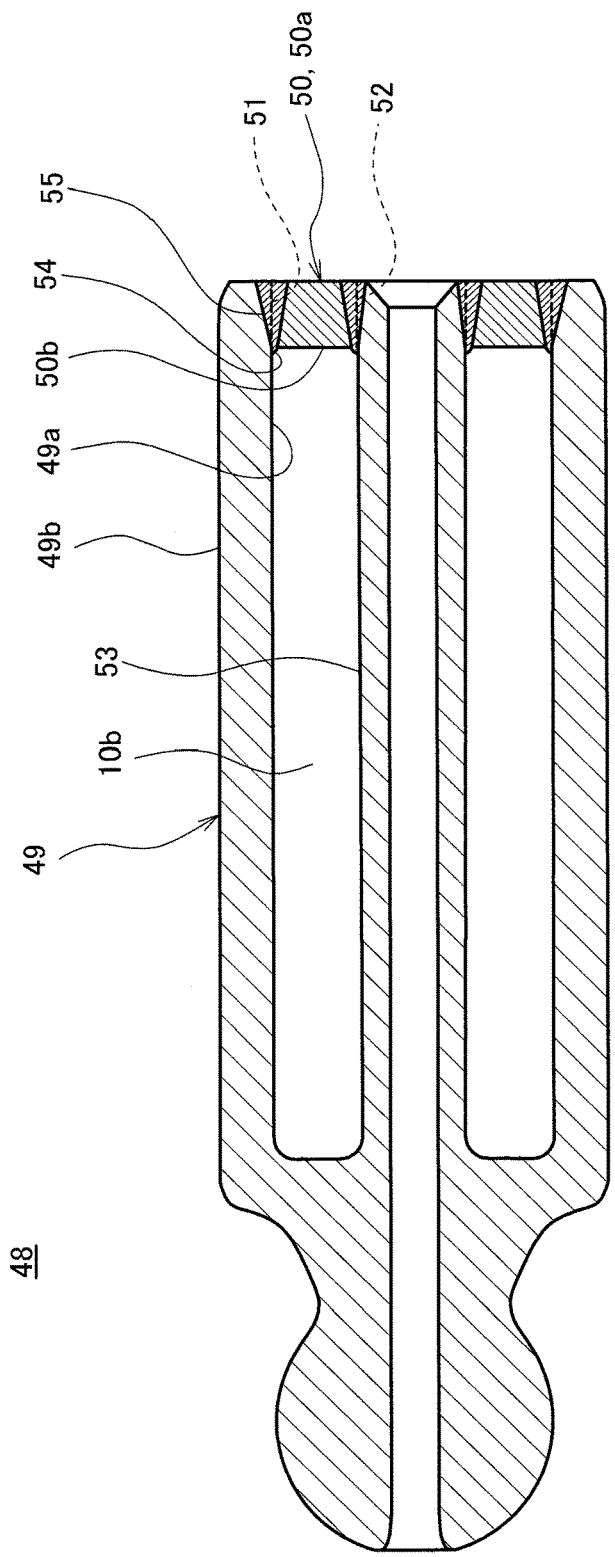
FIG. 18 is a longitudinal sectional view of the piston used in the conventional liquid-pressure rotating device.
Figure 19:
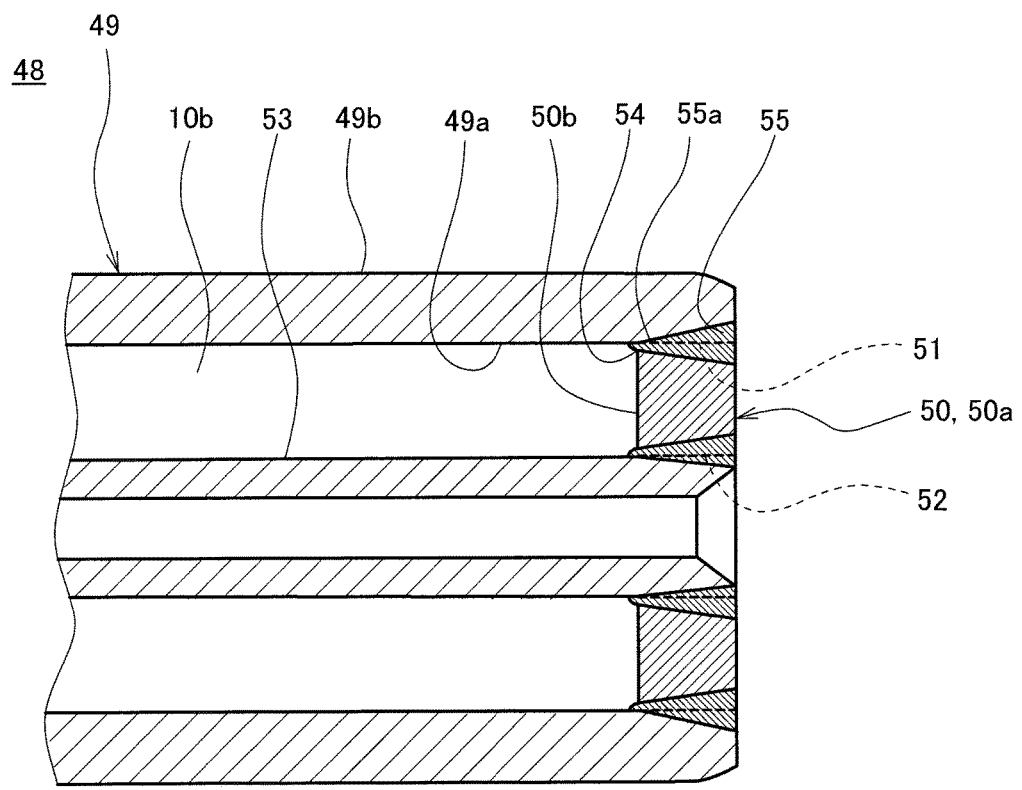
FIG. 19 is a partially enlarged sectional view showing a welded portion of the piston shown in FIG. 18.

The liquid-pressure rotating device 1 shown in FIG. 17 is, for example, a swash plate liquid-pressure rotating device. The swash plate liquid-pressure rotating device can be used as an axial piston motor (liquid-pressure motor) or an axial piston pump (liquid-pressure pump). Embodiment 1 explains an example in which the swash plate liquid-pressure rotating device 1 is used as an oil-pressure motor.

Embodiment 1 explains the swash plate liquid-pressure rotating device as one example of the liquid-pressure rotating device of the present invention. However, instead of this, the present invention is applicable to an inclined shaft liquid-pressure rotating device (an inclined shaft axial piston motor or an inclined shaft axial piston pump). For example, operating oil can be used as an operating liquid.

The swash plate liquid-pressure rotating device 1 shown in FIG. 17 includes a substantially tubular casing main body 2. A right opening of the casing main body 2 is closed by a valve cover 3. A supply passage 3a and a discharge passage (not shown) are formed in the valve cover 3. A left opening of the casing main body 2 is closed by a swash plate supporting portion 4.

A rotating shaft (driving shaft) 5 is arranged in the casing main body 2 substantially horizontally in a leftward/rightward direction. The rotating shaft 5 is rotatably provided at the valve cover 3 and the swash plate supporting portion 4 via bearings 6 and 7. The bearing 7 is internally fitted in the swash plate supporting portion 4, and a seal cover 8 is attached to an outside of the bearing 7.

The cylinder block 9 is splined to the rotating shaft 5 and rotates integrally with the rotating shaft 5.

The piston chambers 9a are concavely formed in the cylinder block 9 so as to be spaced apart from one another at regular intervals in a circumferential direction around a rotation axis M of the rotating shaft 5. Each of the piston chambers 9a is in parallel with the rotation axis M, and the pistons 61 are accommodated in the respective piston chambers 9a.

A tip end portion 10a of the piston 61 projecting from the piston chamber 9a is formed in a spherical shape. The tip end portion 10a is rotatably attached to a fitting concave portion 13a formed in a shoe 13.

The swash plate 12 is arranged at a contact surface 13b of the shoe 13 via a shoe plate 41, the contact surface 13b being opposite to the fitting concave portion 13a. The shoe 13 is pressed toward the swash plate 12 by fitting a retainer plate 14 to the shoe 13 from the cylinder block 9 side.

The shoe plate 41 includes a smooth surface 26a contacting the contact surface 13b of the shoe 13. When the cylinder block 9 rotates, the shoe 13 is guided along the smooth surface 26a to rotate, and the piston 61 reciprocates in a direction along the rotation axis M.

A circular-arc convex surface 32 is provided at a surface of the swash plate 12, the surface being opposite to the shoe plate 41. The convex surface 32 is slidably supported by a circular-arc concave surface 22 formed on the swash plate supporting portion 4.

Further, as shown in FIG. 17, a valve plate 25 which slides on and contacts the cylinder block 9 is attached to an inner surface side of the valve cover 3. A supply port 25a and a discharge port 25b are formed in the valve plate 25. An oil passage 9b communicating with the piston chamber 9a of the cylinder block 9 communicates with the supply port 25a or the discharge port 25b depending on a rotation angle position of the cylinder block 9. The valve cover 3 includes: the supply passage 3a which communicates with the supply port 25a of the valve plate 25 and opens on an outer side surface of the valve cover 3; and the discharge passage (not shown) which communicates with the discharge port 25b of the valve plate 25 and opens on the outer side surface of the valve cover 3.

As shown in FIG. 17, a tilt adjustment driving portion 47 is provided at an upper portion of the casing main body 2. The tilt adjustment driving portion 47 can cause each of a tilt adjustment large-diameter piston 44 and a tilt adjustment small-diameter piston 45 to slide in a desired leftward or rightward direction by a desired distance. Thus, a tilting angle θ of the swash plate 12 relative to the rotation axis M can be changed. At this time, the convex surface 32 of the swash plate 12 is guided by the concave surface 22 of the swash plate supporting portion 4, and the swash plate 12 rotates around a predetermined center axis in an elevation angle direction G shown in FIG. 17. With this, the amount of stroke of the piston 61 can be changed, and therefore, a rotating speed of the rotating shaft 5 can be adjusted.

Next, the piston 61 of Embodiment 1 will be explained in reference to FIGS. 1 to 3. The piston 61 shown in FIG. 1 includes a peripheral wall main body portion 62 and a lid portion 63.

The peripheral wall main body portion 62 is a cylindrical member including a hollow portion 62b, and an opening portion 64 which communicates with the hollow portion 62b is formed at one end of the peripheral wall main body portion 62. The other end portion (tip end portion) 62a of the piston 61 is formed in a spherical shape and is rotatably attached to the fitting concave portion 13a formed at the shoe 13.

The lid portion 63 is welded to an inner peripheral surface of the opening portion 64 of the peripheral wall main body portion 62 to seal the hollow portion 62b, and an outer surface of the lid portion 63 is formed as a pressure receiving surface 63a which receives liquid pressure. For example, electron beam welding (EBW) or laser welding is used as a welding method.

Figure 2:
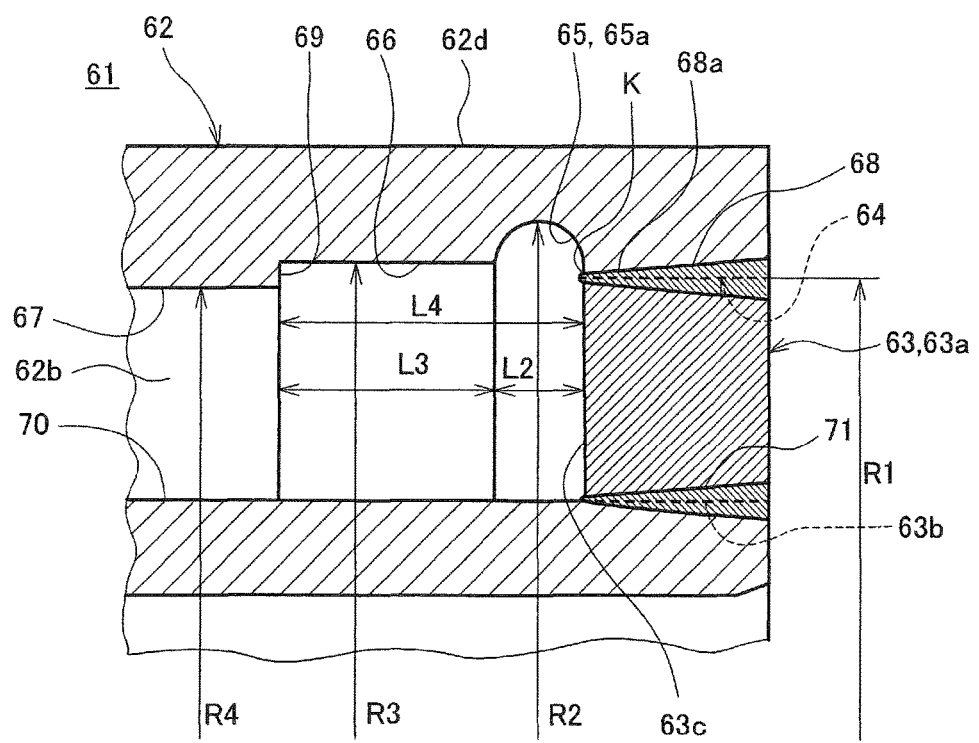
FIG. 2 is a partially enlarged sectional view showing a portion A of FIG. 1.

As shown in FIG. 2, a stress reducing portion 65, a large-diameter concave portion 66, and a small-diameter portion 67 are formed on an inner peripheral surface of the peripheral wall main body portion 62 in this order in a direction away from the lid portion 63.

The stress reducing portion 65 reduces stress acting on an end portion 68a of a welded portion 68, the end portion 68a being located at the hollow portion 62b side. The stress reducing portion 65 is provided at such a position as to be in contact with or close to the end portion 68a of the welded portion 68 formed between the inner peripheral surface of the opening portion 64 of the peripheral wall main body portion 62 and an outer peripheral surface of the lid portion 63. Each of an inner radius of the opening portion 64 of the peripheral wall main body portion 62 before the welding and an outer radius of the lid portion 63 before the welding, that is, a radius of the annular welded portion 68 is denoted by R1 (see FIG. 2).

As shown in FIG. 2, the stress reducing portion 65 is formed as an annular concave portion having: a circular-arc (for example, semi-circular) cross section through which a center line O of the peripheral wall main body portion 62 extends; a width L2; and a radius R2.

As shown in FIG. 2, the large-diameter concave portion 66 is a cylindrical concave portion having a width L3 and a radius R3. The large-diameter concave portion 66 is formed adjacent to the stress reducing portion 65 and located at a far side of the stress reducing portion 65 in the peripheral wall main body portion 62. The small-diameter portion 67 has a radius R4, that is, has a smaller inner radius than the large-diameter concave portion 66. The small-diameter portion 67 is formed adjacent to the large-diameter concave portion 66 and located at a far side of the large-diameter concave portion 66 in the peripheral wall main body portion 62.

In the present embodiment, a relation "R2>R3>R1>R4" is satisfied.

As shown in FIG. 2, an end surface of the small-diameter portion 67 is formed as an annular step portion 69, the end surface being located at the large-diameter concave portion 66 side. To be specific, the annular step portion 69 is formed at an end portion of the small-diameter portion 67 projecting from the inner peripheral surface of the peripheral wall main body portion 62, the end portion being located at the lid portion 63 side. Regarding a direction along the center line O of the peripheral wall main body portion 62, the annular step portion 69 opposes the end portion 68a of the welded portion 68 so as to be spaced apart from the end portion 68a by an interval L4.

As described below, the interval L4 is set such that when welding the lid portion 63 to the opening portion 64, the end portion 68a of the welded portion 68 is not coupled to the step portion 69 through an extended welded portion (not shown).

Figure 1:
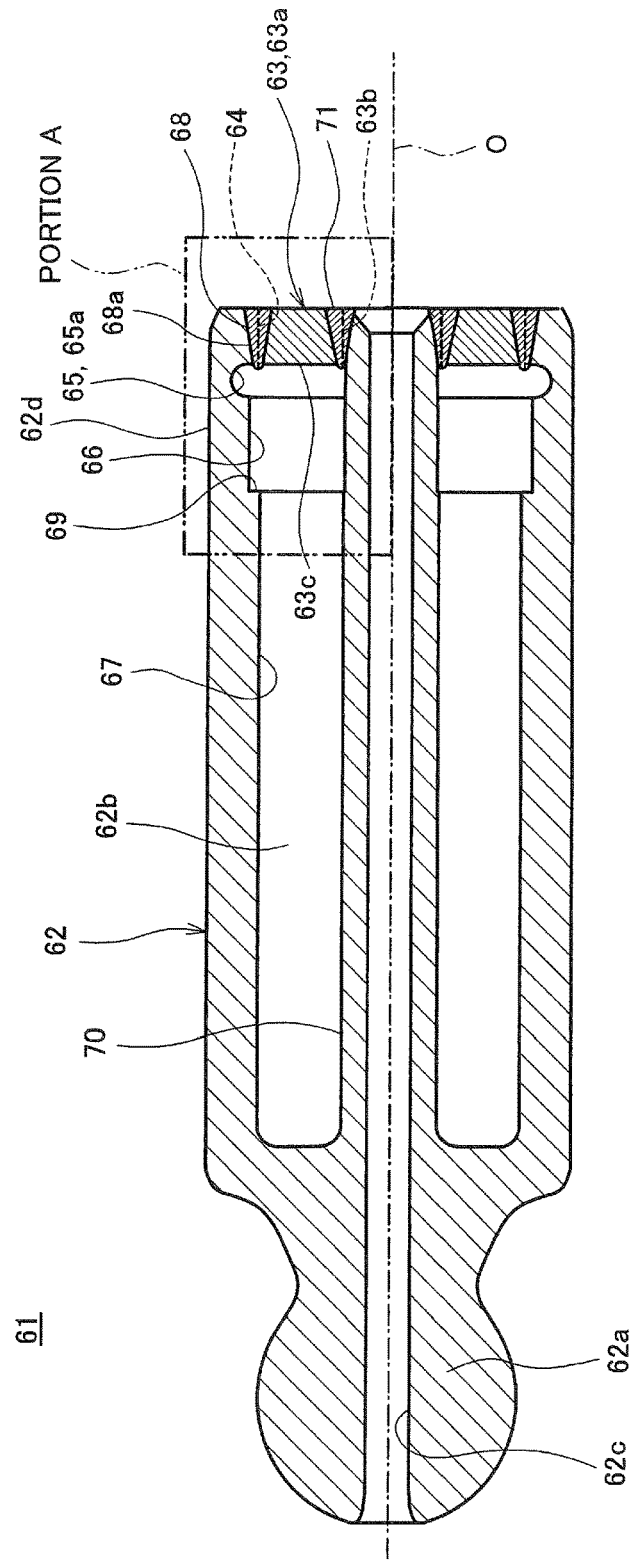
FIG. 1 is a longitudinal sectional view of a piston included in a liquid-pressure rotating device according to Embodiment 1 of the present invention.

Further, as shown in FIG. 1, a tubular liquid passage portion 70 is provided at a position through which the center line O of the piston 61 extends. The liquid passage portion 70 causes outer surfaces of both end portions of the piston 61 to communicate with each other, that is, the liquid passage portion 70 causes the pressure receiving surface 63a of the lid portion 63 and the tip end portion (other end portion) 62a of the piston 61 to communicate with each other.

The liquid passage portion 70 is a thin cylindrical portion, and a liquid passage is formed in the liquid passage portion 70. A right end portion of the liquid passage portion 70 shown in FIG. 1 is welded to a center hole 63b formed at a center of the lid portion 63 and opens outward on the pressure receiving surface 63a of the lid portion 63. A reference sign 71 shown in FIGS. 1 and 2 denotes a welded portion. A left end portion of the liquid passage portion 70 is coupled to an inner surface of the tip end portion 62a of the piston 61, the inner surface being located at the hollow portion 62b side. The left end portion of the liquid passage portion 70 opens outward on an outer surface of the tip end portion 62a through a communication hole 62c formed in the tip end portion 62a.

According to the liquid passage portion 70, the operating liquid at the pressure receiving surface 63a side of the lid portion 63 welded to one end portion of the piston 61 can be guided to the outer surface of the tip end portion 62a of the piston 61 through the liquid passage portion 70. With this, for example, a contact portion (fitting concave portion 13a) between the tip end portion 62a and the shoe 13 swingably fitting to the tip end portion 62a is lubricated by the operating liquid. Thus, frictional resistance at the contact portion can be reduced.

Next, the actions of the piston 61 configured as above and the actions of a liquid-pressure rotating device 72 will be explained. According to the piston 61 shown in FIGS. 1 and 2, the cylindrical peripheral wall main body portion 62 constituting the piston 61 includes the hollow portion 62b. The hollow portion 62b is sealed by the lid portion 63, so that the operating liquid does not flow into the hollow portion 62b. Thus, the weight of the piston 61 can be reduced.

Since the volume (dead volume) of the space surrounded by the piston 61 and the piston chamber 9a can be made small, a compression loss generated by compressibility of the operating liquid can be reduced.

Figure 3:
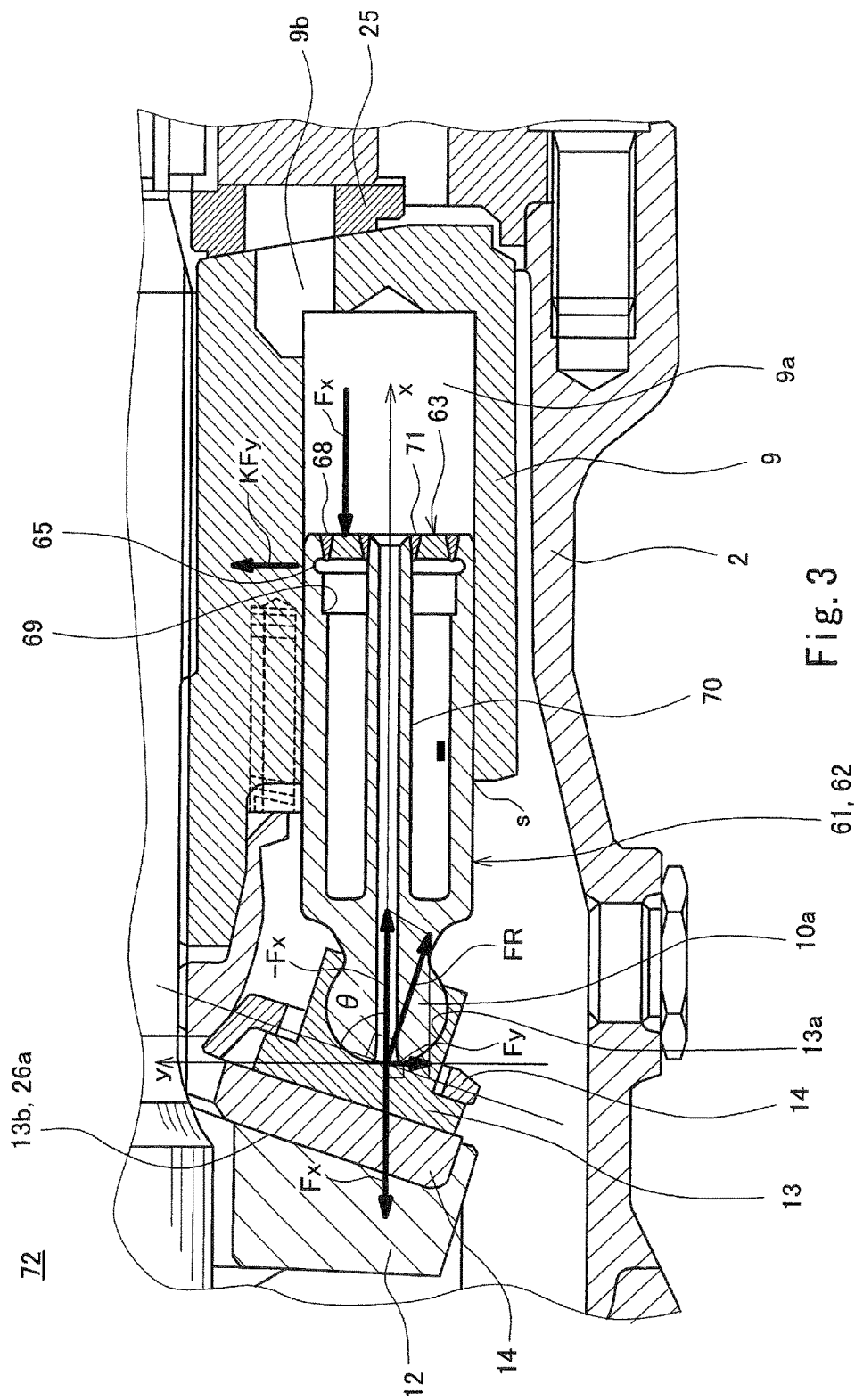
FIG. 3 is a partially enlarged sectional view showing a state where the piston shown in FIG. 1 is attached to the liquid-pressure rotating device.

The welded portion 68 formed between the opening portion 64 of the peripheral wall main body portion 62 and the lid portion 63 receives residual stress of the welded portion 68, force Fx acting on the pressure receiving surface 63a of the piston 61, and force KFy (reaction force) acting on an outer peripheral surface 62d of the piston 61 (see FIG. 3). The stress reducing portion 65 can reduce the stress, the force Fx, and the force KFy such that the stress, the force Fx, and the force KFy do not concentrate on the end portion 68a of the welded portion 68, the end portion 68a being relatively low in strength. With this, fatigue strength of the end portion 68a of the welded portion 68 can be improved, and therefore, strength of the piston 61 can be increased.

Therefore, according to the piston 61 shown in FIG. 1, an energy conversion efficiency and maximum rotating speed of the liquid-pressure rotating device 72 in which the piston 61 is provided and which is used as a pump or a motor can be improved. Further, since the piston 61 includes the stress reducing portion 65, the strength of the piston 61 can be increased, so that the life of the piston 61 can be extended.

Next, the force Fx and the force KFy acting on the piston 61 will be explained in reference to FIG. 3. FIG. 3 is a partially enlarged sectional view showing a state where the pistons 61 shown in FIG. 1 are attached to the respective piston chambers 9a of the liquid-pressure rotating device 1 shown in FIG. 17.

As shown in FIG. 3, horizontal pushing force Fx based on the pressure of a pressure liquid in the piston chamber 9a acts on the pressure receiving surface 63a of the piston 61. By the pushing force Fx, the outer surface of the tip end portion 62a of the piston 61 pushes the fitting concave portion 13a of the shoe 13 in the horizontal direction. Reaction force of the pushing force Fx is denoted by −Fx. A tilting angle of the swash plate 12 relative to the rotation axis M is denoted by θ. Therefore, opposing force FR acting in a direction perpendicular to a surface of the swash plate 12 acts on the tip end portion 62a of the piston 61, and a y-direction component of the opposing force FR is denoted by Fy (in FIG. 3, the y direction is a direction perpendicular to the rotation axis M). The y-direction component Fy generates a moment by which the piston 61 rotates in a counterclockwise direction by using a corner portion S of the piston chamber 9a shown in FIG. 3 as a fulcrum. By this moment, an upper surface of an end portion of the piston 61 pushes an inner surface of the piston chamber 9a by the force KFy, the end portion being located at the lid portion 63 side. Therefore, reaction force of the pushing force KFy acts on the upper surface of the end portion of the piston 61.

As above, the welded portion 68 formed between the opening portion 64 of the peripheral wall main body portion 62 and the lid portion 63 receives the residual stress of the welded portion 68, the force Fx acting on the pressure receiving surface 63a of the piston 61, and the force KFy acting on the outer peripheral surface 62d of the piston 61. The stress reducing portion 65 can reduce the stress, the force Fx, and the force KFy such that the stress, the force Fx, and the force KFy do not concentrate on the end portion 68a of the welded portion 68, the end portion 68a being relatively low in strength.

As shown in FIG. 2, the stress reducing portion 65 is the annular concave portion having the circular-arc (for example, semi-circular) cross section through which the center line O of the peripheral wall main body portion 62 extends. Therefore, according to the stress reducing portion 65, a portion K where an inner surface 63c of the lid portion 63 and an inner peripheral surface 65a of the stress reducing portion 65 are coupled to each other can be formed as not a corner angle portion but a substantially flat portion. On this account, the stress reducing portion 65 can prevent the stress from concentrating on the end portion 68a of the welded portion 68 formed at the substantially flat portion. As a result, the fatigue strength of the end portion 68a of the welded portion 68 can be improved. With this, the life of the piston 61 can be extended.

Further, the interval L4 between the step portion 69 and the end portion 68a of the welded portion 68 shown in FIG. 2 is set such that when welding the lid portion 63 to the opening portion 64, the end portion 68a of the welded portion 68 is not coupled to the step portion 69 through the extended welded portion (not shown).

With this, when welding the lid portion 63 to the opening portion 64, the end portion 68a of the welded portion 68 can be prevented from being coupled to the step portion 69 through the extended welded portion.

To be specific, in a case where the extended welded portion (not shown) extends beyond a portion where the outer peripheral surface of the lid portion 63 and the inner peripheral surface of the peripheral wall main body portion 62 are fitted to each other, so as to be exposed at the hollow portion 62b side of the peripheral wall main body portion 62, and the extended welded portion is coupled to the step portion 69, the extended welded portion becomes a cylindrical wall portion, and a corner portion formed by an inner peripheral surface of this cylindrical wall portion and the inner surface 63c of the lid portion 63 becomes the corner angle portion. With this, the stress concentrates on the end portion 68a of the welded portion 68 formed at the corner angle portion, and therefore, the fatigue strength of the end portion 68a of the welded portion 68 deteriorates.

However, according to the present embodiment, in a case where the end portion 68a of the welded portion 68 is not coupled to the step portion 69 through the extended welded portion, and for example, the extended welded portion is formed as not the cylindrical wall portion but an annular projection, a portion where the end portion 68a of the welded portion 68 is formed does not become the corner angle portion. Thus, the stress can be prevented from concentrating on the end portion 68a.

Therefore, the end portion 68a of the welded portion 68 can be prevented from being coupled to the step portion 69 through the extended welded portion, so that the fatigue strength of the end portion 68a of the welded portion 68 can be prevented from deteriorating.

The reason why the step portion 69 is formed on the inner peripheral surface of the peripheral wall main body portion 62 is because: the large-diameter concave portion 66 is formed on the inner peripheral surface of the peripheral wall main body portion 62 so as to be located at a far side of the stress reducing portion 65 in the hollow portion 62b, the large-diameter concave portion 66 being larger in inner radius than the end portion 68a of the welded portion 68; and the small-diameter portion 67 is formed on the inner peripheral surface of the peripheral wall main body portion 62 so as to be located at a far side of the large-diameter concave portion 66 in the hollow portion 62b. The step portion 69 is formed between the large-diameter concave portion 66 and the small-diameter portion 67. By forming the large-diameter concave portion 66, the extended welded portion can be prevented from being coupled to the inner peripheral surface located at a far side of the stress reducing portion 65 of the peripheral wall main body portion 62.

Further, as above, in a case where the large-diameter concave portion 66 which is larger in inner radius than the end portion 68a of the welded portion 68 is formed on the inner peripheral surface of the peripheral wall main body portion 62 so as to be located at a far side of the stress reducing portion 65 in the hollow portion 62b, the inner radius R1 of the opening portion 64 of the peripheral wall main body portion 62 can be designed so as to be larger than the inner radius R4 of the small-diameter portion 67 of the peripheral wall main body portion 62. With this, the peripheral wall main body portion 62 can be manufactured by forging, and it is unnecessary to form the entire small-diameter portion 67 by boring (cutting). Thus, the manufacturing cost can be reduced. It should be noted that the inner peripheral surface of the opening portion 64 of the peripheral wall main body portion 62 and the inner peripheral surface of the large-diameter concave portion 66 shown in FIG. 2 are subjected to the boring for surface processing for welding.

Next, Embodiments 2 to 4 of the piston included in the liquid-pressure rotating device according to the present invention will be explained in reference to FIGS. 4 to 6. Each of pistons 74, 75, and 76 of Embodiments 2 to 4 shown in FIGS. 4 to 6 is different from the piston 61 of Embodiment 1 shown in FIGS. 1 and 2 regarding the cross-sectional shape of the stress reducing portion.

Figure 4:
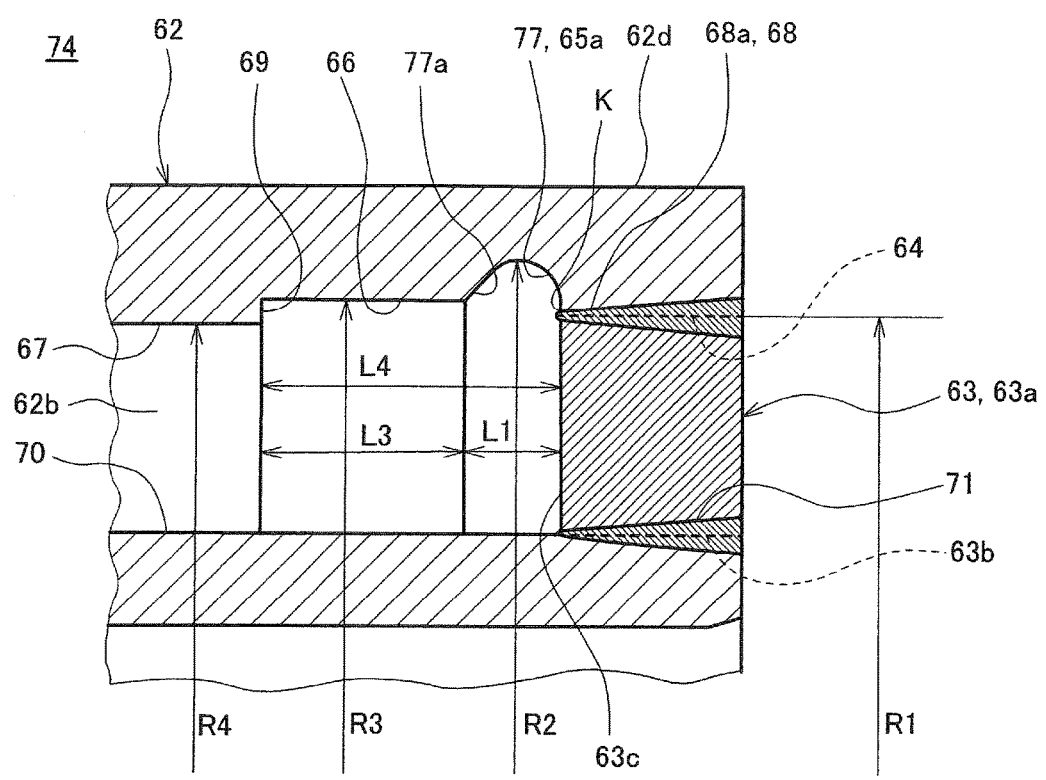
FIG. 4 is a partially enlarged sectional view of a portion of the piston included in the liquid-pressure rotating device according to Embodiment 2 of the present invention, the portion corresponding to the portion A of FIG. 1.
Figure 5:
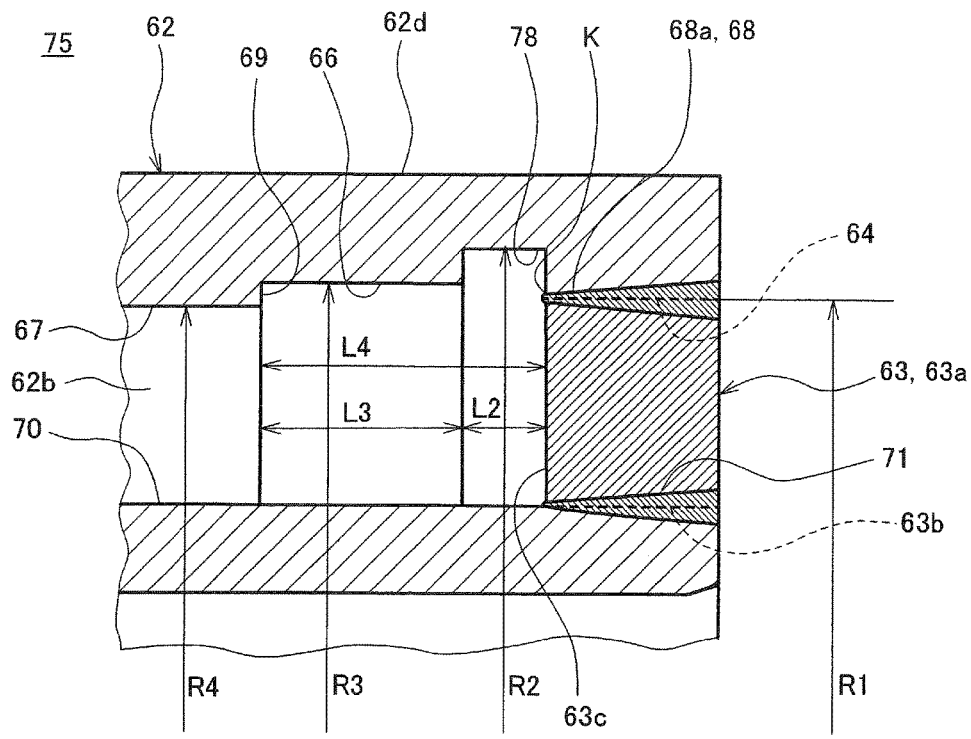
FIG. 5 is a partially enlarged sectional view of a portion of the piston included in the liquid-pressure rotating device according to Embodiment 3 of the present invention, the portion corresponding to the portion A of FIG. 1.
Figure 6:
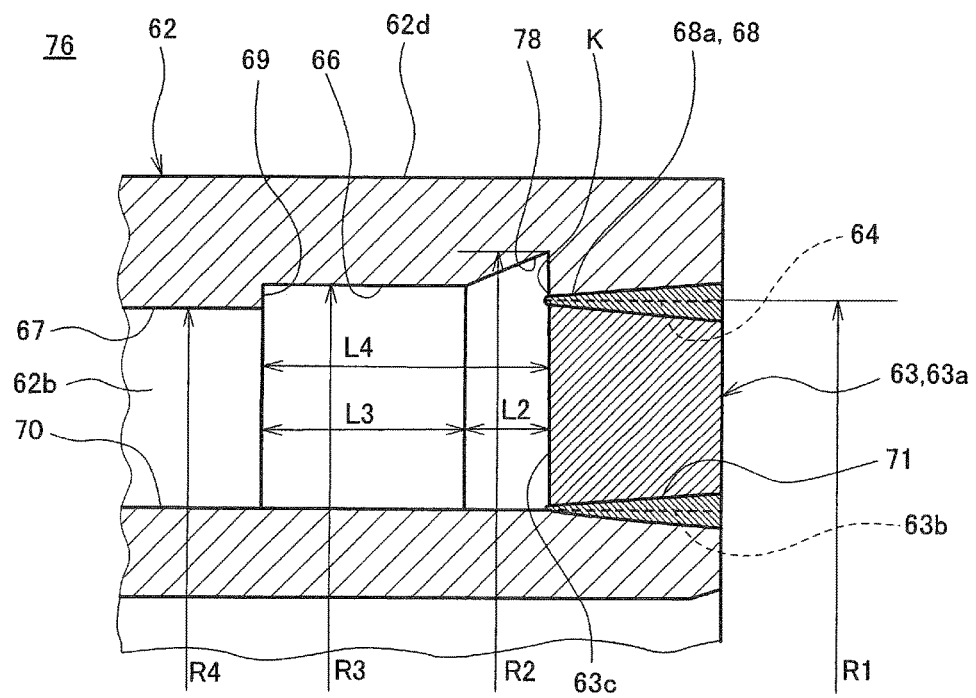
FIG. 6 is a partially enlarged sectional view of a portion of the piston included in the liquid-pressure rotating device according to Embodiment 4 of the present invention, the portion corresponding to the portion A of FIG. 1.

Other than the above, each of the pistons 74, 75, and 76 of Embodiments 2 to 4 shown in FIGS. 4 to 6 is the same in configuration as the piston 61 of Embodiment 1 shown in FIG. 1 and acts in the same manner as the piston 61 of Embodiment 1 shown in FIG. 1. Therefore, the same reference signs are used for the same components, and a repetition of the same explanation is avoided.

A cross-sectional shape of a stress reducing portion 77 of Embodiment 2 shown in FIG. 4 is formed such that regarding the semi-circular cross-sectional shape of the stress reducing portion 65 of Embodiment 1 shown in FIG. 2, a substantially one-third portion at the step portion 69 side is formed as a linear oblique surface portion 77a. A width of the stress reducing portion 77 is denoted by L1 (>L2).

As above, in a case where the substantially one-third portion of the stress reducing portion 77 at the step portion 69 side is formed as the linear oblique surface portion 77a, it is possible to further reduce a possibility that the extended welded portion (not shown) which may be formed so as to extend from the end portion 68a of the welded portion 68 toward the step portion 69 is coupled to the inner peripheral surface of the large-diameter concave portion 66.

A cross-sectional shape of a stress reducing portion 78 of Embodiment 3 shown in FIG. 5 is a substantially rectangular shape having a bottom portion parallel to the center line O of the peripheral wall main body portion 62, and a radius of the bottom portion is, for example, the same as Embodiment 1, that is, denoted by R2. As above, in a case where the cross-sectional shape of the stress reducing portion 78 is the rectangular shape, for example, workability when the stress reducing portion 78 is subjected to the boring can be improved.

A cross-sectional shape of a stress reducing portion 79 of Embodiment 4 shown in FIG. 6 is a substantially right angled triangle. A bottom portion of the cross-sectional shape of the stress reducing portion 79 is formed as a linear oblique surface portion whose inner diameter decreases as the linear oblique surface portion extends toward the step portion 69.

As above, in a case where the entire bottom portion of the stress reducing portion 79 is formed as the linear oblique surface portion, as with FIG. 4, it is possible to reduce the possibility that the extended welded portion (not shown) which may be formed so as to extend from the end portion 68a of the welded portion 68 toward the step portion 69 is coupled to the inner peripheral surface of the large-diameter concave portion 66.

Next, Embodiments 5 to 9 of the piston included in the liquid-pressure rotating device according to the present invention will be explained in reference to FIGS. 7 to 11. Each of pistons 81, 82, 83, 84, and 85 of Embodiments 5 to 9 shown in FIGS. 7 to 11 is different from the piston 61 of Embodiment 1 shown in FIGS. 1 and 2 in that: in Embodiment 1 shown in FIG. 1, the stress reducing portion 65 is provided on the inner peripheral surface of the peripheral wall main body portion 62; and in each of Embodiments 5 to 9 shown in FIGS. 7 to 11, a stress reducing portion 86, 87, 88, 89, or 90 is provided on the inner surface 63c of the lid portion 63, the inner surface 63c being located at the hollow portion 62b side.

Each of the stress reducing portions 86, 87, 88, 89, and 90 of Embodiments 5 to 9 shown in FIGS. 7 to 11 is provided on the inner surface 63c of the lid portion 63 adjacent to the end portion 68a of the welded portion 68 formed between the opening portion 64 of the peripheral wall main body portion 62 and the lid portion 63. Each of the stress reducing portions 86, 87, 88, 89, and 90 can reduce the stress acting on the end portion 68a of the welded portion 68.

As shown in FIGS. 7 to 11, the large-diameter concave portion 66 and the step portion 69 are not formed on the inner peripheral surface of the peripheral wall main body portion 62 of each of Embodiments 5 to 9. This is because the stress reducing portion 65 as the annular concave portion and the like are not formed on the inner peripheral surface of the peripheral wall main body portion 62. To be specific, this is because even if the extended welded portion is formed so as to extend from the end portion 68a of the welded portion 68 toward a far side in the hollow portion 62b, the annular concave portion (the stress reducing portion 65 or the like) which is prevented from being closed by the extended welded portion does not exist.

Therefore, the peripheral wall main body portion 62 is formed in such a cylindrical shape that each of a radius of the inner peripheral surface of the opening portion 64 and a radius of the inner peripheral surface (the small-diameter portion 67) located at a far side of the opening portion 64 in the hollow portion 62b is denoted by R1.

Other than the above, each of the pistons of Embodiments 5 to 9 shown in FIGS. 7 to 11 is the same in configuration as the piston 61 of Embodiment 1 shown in FIG. 1 and acts in the same manner as the piston 61 of Embodiment 1 shown in FIG. 1. Therefore, the same reference signs are used for the same components, and a repetition of the same explanation is avoided.

Each of the stress reducing portions 86, 87, 88, 89, and 90 of Embodiments 5 to 9 shown in FIGS. 7 to 11 is formed as an annular thin portion projecting from an outer peripheral portion of the inner surface 63c of the lid portion 63 toward the hollow portion 62b. The welded portion 68 is formed between the outer peripheral surface of the lid portion 63 including the thin portion and the inner peripheral surface of the opening portion 64 of the peripheral wall main body portion 62.

The stress reducing portion 86, 87, 88, 89, and 90 of Embodiments 5 to 9 shown in FIGS. 7 to 11 are different from one another regarding cross-sectional shapes of annular concave portions 91, 92, 93, 94, and 95 by which the thin portions, such as the stress reducing portion 86, are formed. The annular concave portion 91 or the like is formed on the inner surface 63c of the lid portion 63.

Figure 7:
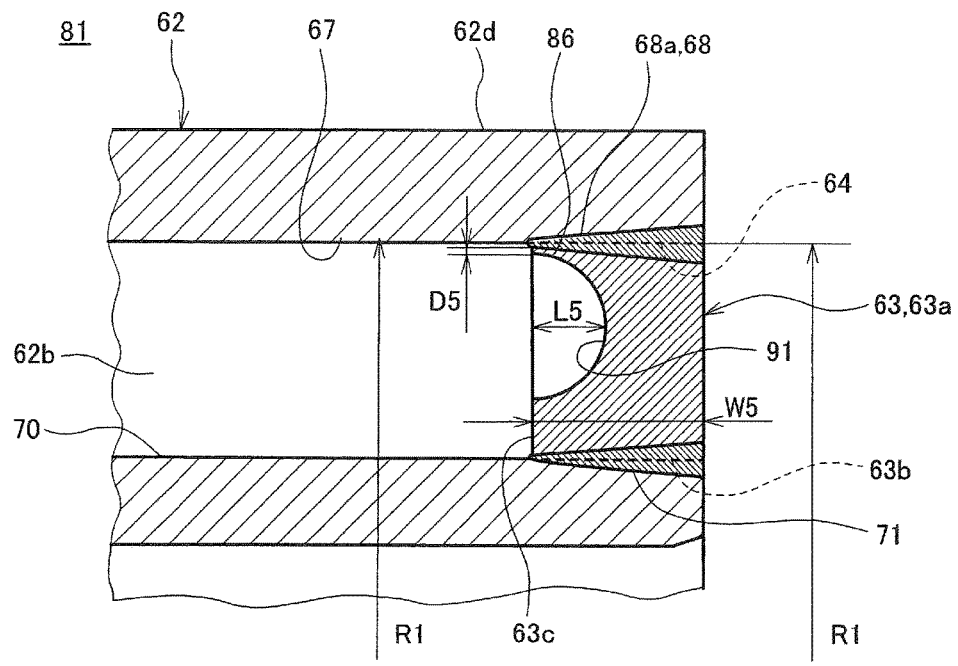
FIG. 7 is a partially enlarged sectional view of a portion of the piston included in the liquid-pressure rotating device according to Embodiment 5 of the present invention, the portion corresponding to the portion A of FIG. 1.

The annular concave portion 91 of Embodiment 5 shown in FIG. 7 is has a semi-circular cross section and a radius L5. A thickness of a tip end portion of the annular thin portion as the stress reducing portion 86 is denoted by D5, and a thickness of the lid portion 63 is denoted by W5.

According to the stress reducing portion 86 shown in FIG. 7, when the reaction force of the pushing force KFy acts on the outer surface of the peripheral wall main body portion 62 as shown in FIG. 3, the welded portion 68 is sandwiched between the inner peripheral surface of the peripheral wall main body portion 62 and the outer peripheral surface of the thin portion of the lid portion 63 to receive compressive force KFy. However, the peripheral wall main body portion 62, the end portion 68a of the welded portion 68, and the stress reducing portion 86 (thin portion) of the lid portion 63 can bend in a radially inward direction by the pushing force KFy. With this, the stress by the compressive force KFy acting on the end portion 68a of the welded portion 68 can be reduced. As a result, the fatigue strength of the end portion 68a of the welded portion 68 can be improved. With this, the life of the piston 81 can be extended.

As shown in FIG. 7, in a case where the annular stress reducing portion 86 (thin portion) is formed by the annular concave portion 91 formed on the inner surface 63c of the lid portion 63 and having the semi-circular cross section, the thickness W5 of the lid portion 63 itself can be set to an appropriate size, so that the stiffness required for the lid portion 63 can be secured.

Figure 8:
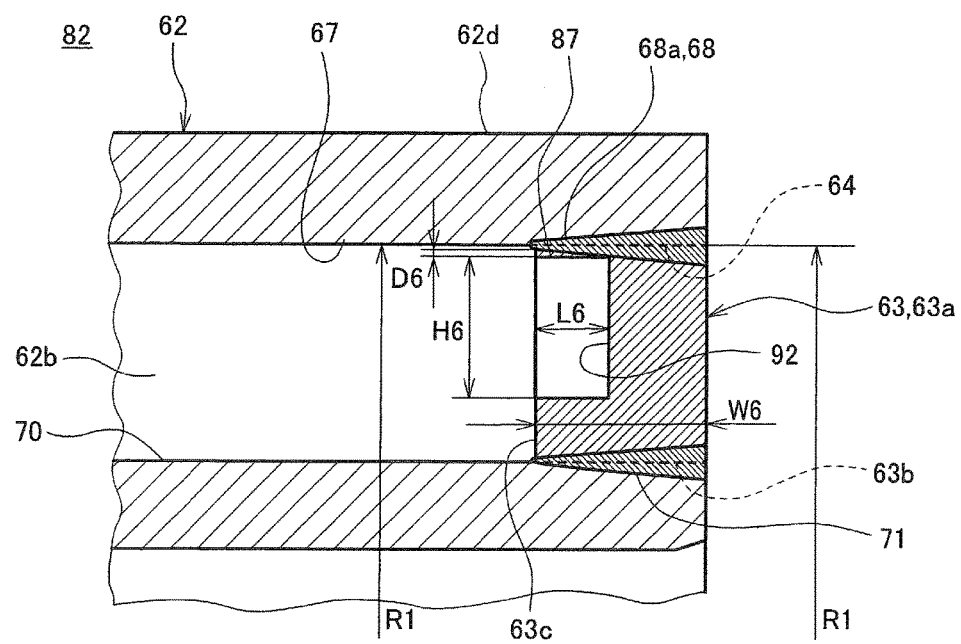
FIG. 8 is a partially enlarged sectional view of a portion of the piston included in the liquid-pressure rotating device according to Embodiment 6 of the present invention, the portion corresponding to the portion A of FIG. 1.

The cross-sectional shape of the annular concave portion 92 of Embodiment 6 shown in FIG. 8 is a substantially rectangular shape having a bottom portion perpendicular to the center line O of the peripheral wall main body portion 62. As above, in a case where the cross-sectional shape of the annular concave portion 92 is the rectangular shape, for example, workability when the annular concave portion 92 is subjected to the boring can be improved. As shown in FIG. 8, a depth to the bottom portion of the cross section of the annular concave portion 92 is denoted by L6, and a width of the cross section of the annular concave portion 92 is denoted by H6. A thickness of the tip end portion of the annular stress reducing portion 87 (thin portion) is denoted by D6, and a thickness of the lid portion 63 is denoted by W6.

Figure 9:
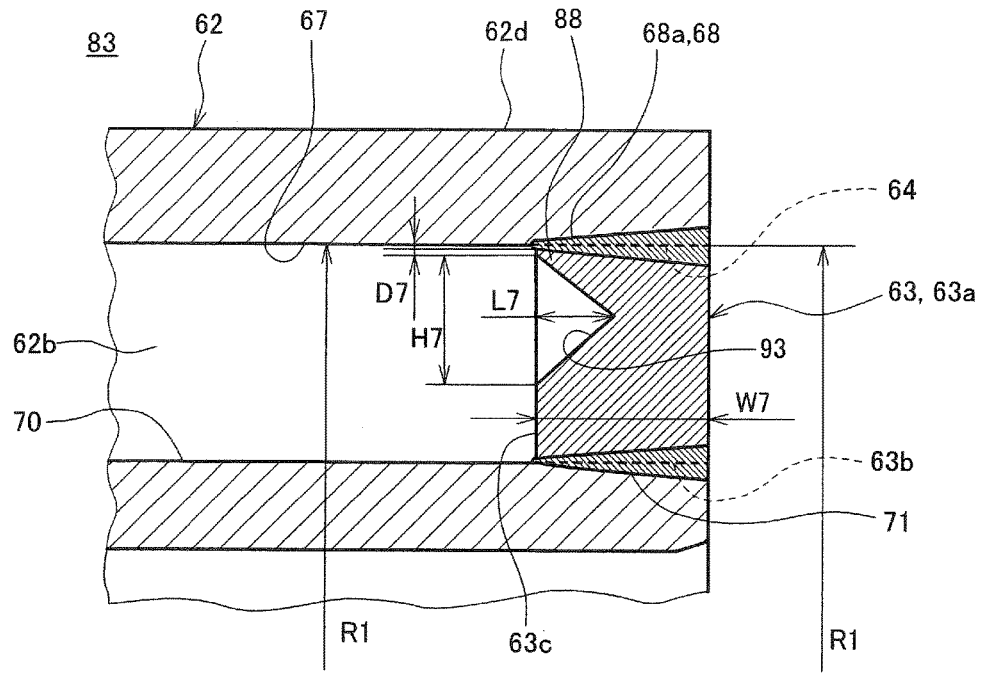
FIG. 9 is a partially enlarged sectional view of a portion of the piston included in the liquid-pressure rotating device according to Embodiment 7 of the present invention, the portion corresponding to the portion A of FIG. 1.

The cross-sectional shape of the annular concave portion 93 of Embodiment 7 shown in FIG. 9 is a substantially isosceles triangle, and the bottom portion of the cross-sectional shape of the annular concave portion 93 is formed by two linear oblique surface portions whose tilt angles are the same as each other.

As above, even in a case where the cross-sectional shape of the annular concave portion 93 is the substantially isosceles triangle, the stress reducing portion 88 (thin portion) can be formed. As shown in FIG. 9, a depth to the bottom portion of the cross section of the annular concave portion 93 is denoted by L7, and a width of the cross section of the annular concave portion 93 is denoted by H7. A thickness of the tip end portion of the annular stress reducing portion 88 (thin portion) is denoted by D7, and a thickness of the lid portion 63 is denoted by W7.

Figure 10:
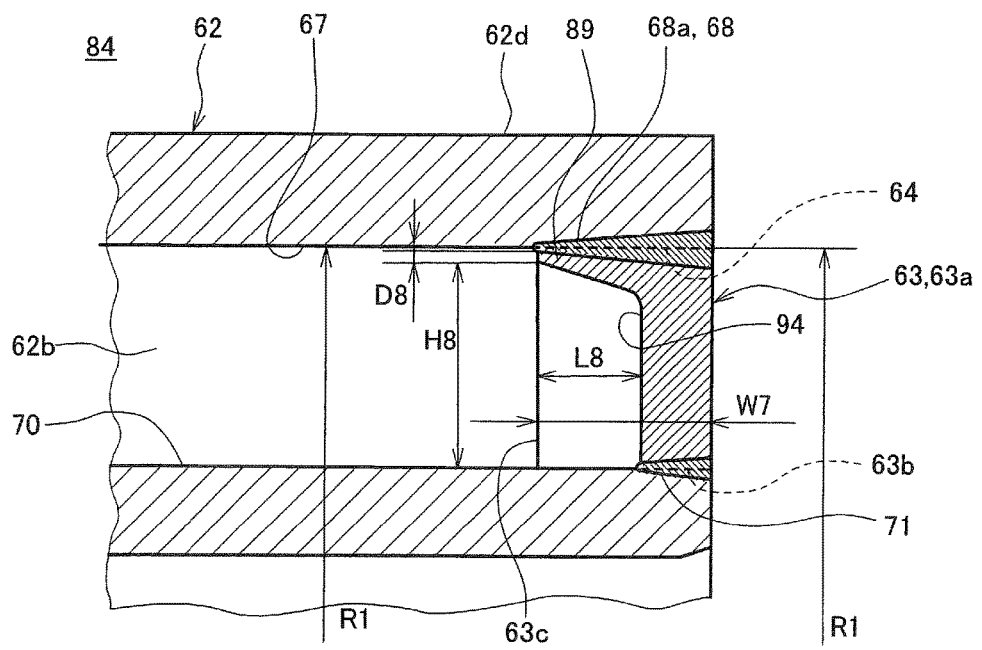
FIG. 10 is a partially enlarged sectional view of a portion of the piston included in the liquid-pressure rotating device according to Embodiment 8 of the present invention, the portion corresponding to the portion A of FIG. 1.

The cross-sectional shape of the annular concave portion 94 of Embodiment 8 shown in FIG. 10 is a substantially trapezoid. A width H of the cross-sectional shape of the annular concave portion 94 decreases toward the bottom portion.

As above, even in a case where the cross-sectional shape of the annular concave portion 94 is the substantially trapezoid, the annular stress reducing portion 89 (thin portion) can be formed. As shown in FIG. 10, a depth to the bottom portion of the cross section of the annular concave portion 94 is denoted by L8, and a width of the opening portion of the annular concave portion 94 is denoted by H8. A thickness of the tip end portion of the annular stress reducing portion 89 (thin portion) is denoted by D8, and a thickness of the lid portion 63 is denoted by W8.

Figure 11:
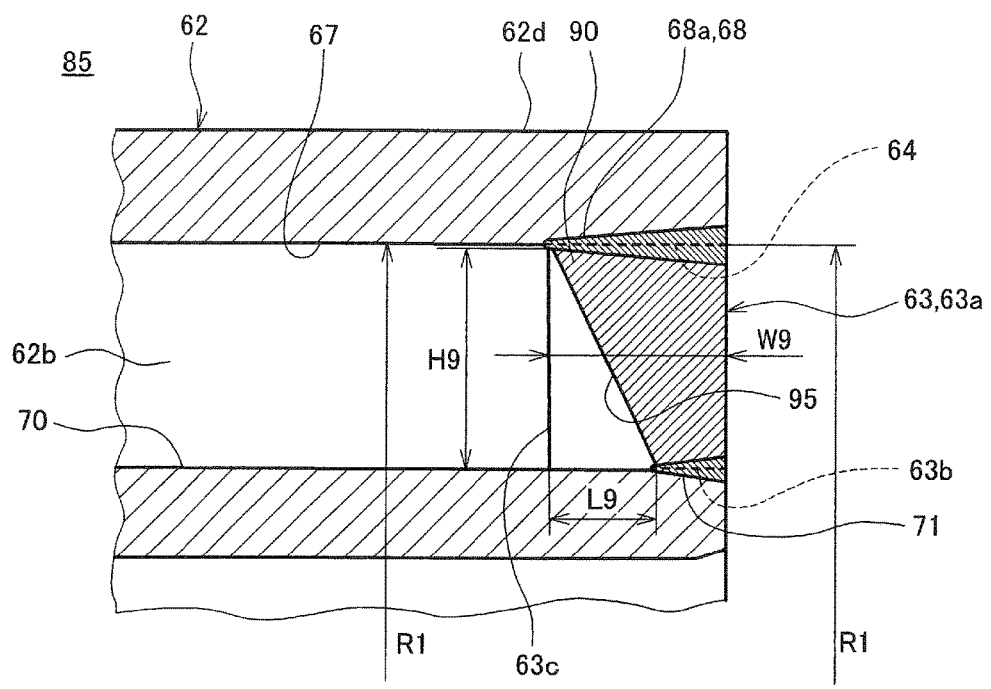
FIG. 11 is a partially enlarged sectional view of a portion of the piston included in the liquid-pressure rotating device according to Embodiment 9 of the present invention, the portion corresponding to the portion A of FIG. 1.

The cross-sectional shape of the annular concave portion 95 of Embodiment 9 shown in FIG. 11 is a substantially right angled triangle. The bottom portion of the cross-sectional shape of the annular concave portion 95 is formed as a linear oblique surface portion whose depth L increases toward a center of the lid portion 63.

As above, even in a case where the cross-sectional shape of the annular concave portion 95 is the substantially right angled triangle, the annular stress reducing portion 90 (thin portion) can be formed. As shown in FIG. 11, a maximum depth to the bottom portion of the cross section of the annular concave portion 95 is denoted by L9, and a width of the concave portion is denoted by H9. The tip end portion of the annular stress reducing portion 90 (thin portion) is formed as a corner portion projecting toward the hollow portion 62b. A thickness of the lid portion 63 is denoted by W9.

Figure 12:
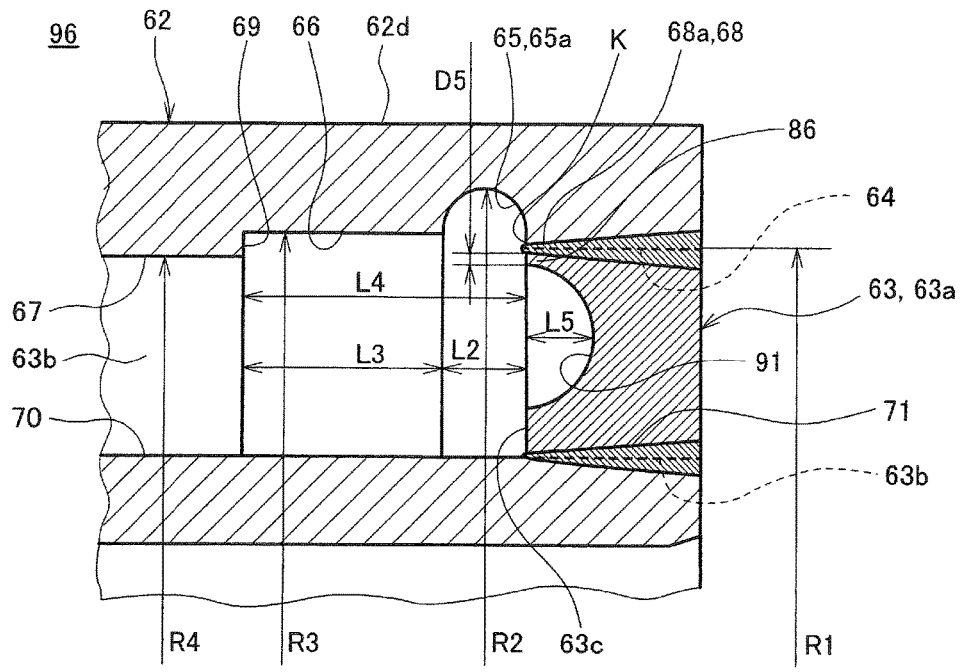
FIG. 12 is a partially enlarged sectional view of a portion of the piston included in the liquid-pressure rotating device according to Embodiment 10 of the present invention, the portion corresponding to the portion A of FIG. 1.

FIG. 12 is a partially enlarged sectional view of a portion of a piston 96 included in the liquid-pressure rotating device according to Embodiment 10 of the present invention, the portion corresponding to the portion A of FIG. 1. Embodiment 10 shown in FIG. 12 is configured such that in Embodiment 1 shown in FIG. 2, the stress reducing portion 86 (thin portion) is provided by forming the annular concave portion 91 of Embodiment 5 shown in FIG. 7 on the inner surface 63c of the lid portion 63. Embodiment 10 can act in the same manner as Embodiments 1 and 5.

Figure 13:
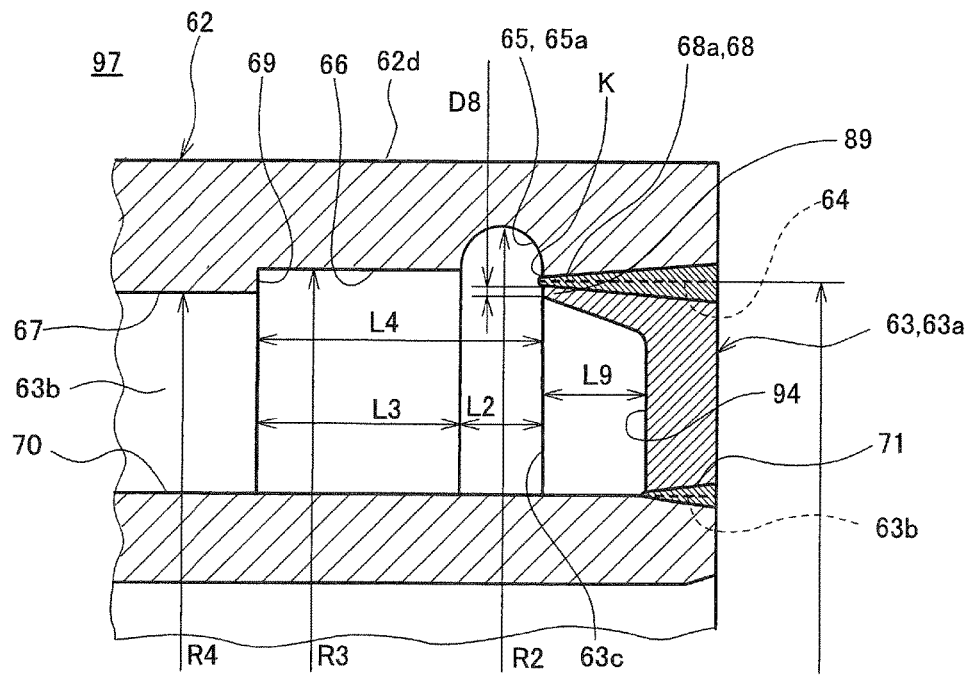
FIG. 13 is a partially enlarged sectional view of a portion of the piston included in the liquid-pressure rotating device according to Embodiment 11 of the present invention, the portion corresponding to the portion A of FIG. 1.

FIG. 13 is a partially enlarged sectional view of a portion of a piston 97 included in the liquid-pressure rotating device according to Embodiment 11 of the present invention, the portion corresponding to the portion A of FIG. 1. Embodiment 11 shown in FIG. 13 is configured such that in Embodiment 1 shown in FIG. 2, the stress reducing portion 89 (thin portion) is provided by forming the annular concave portion 94 of Embodiment 8 shown in FIG. 10 on the inner surface 63c of the lid portion 63. Embodiment 11 can act in the same manner as Embodiments 1 and 8.

In addition to Embodiments 10 and 11, the stress reducing portion of one of Embodiments 1 to 4 and the stress reducing portion of one of Embodiments 5 to 9 may be combined with each other in the same manner as Embodiments 10 and 11.

Figure 14:
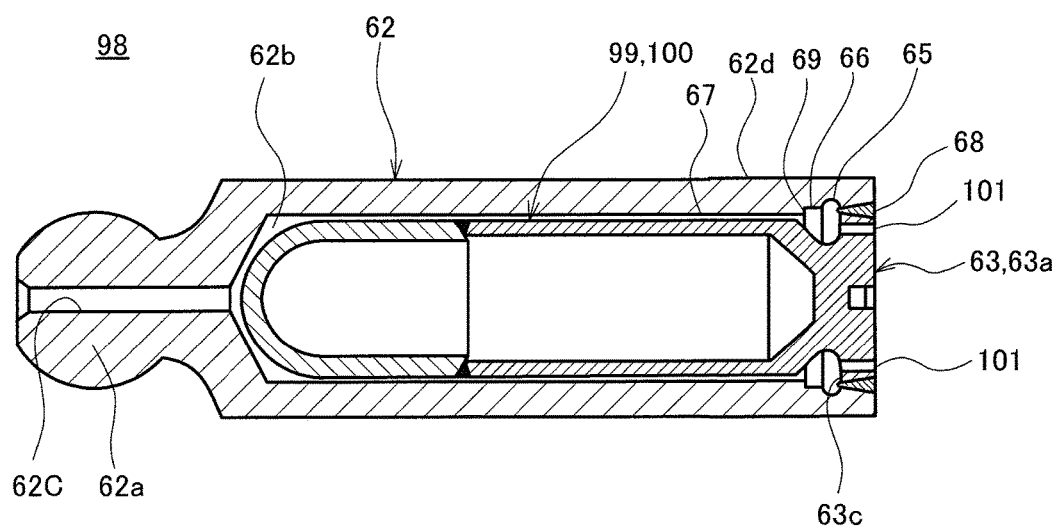
FIG. 14 is a longitudinal sectional view of the piston included in the liquid-pressure rotating device according to Embodiment 12 of the present invention.
Figure 15:
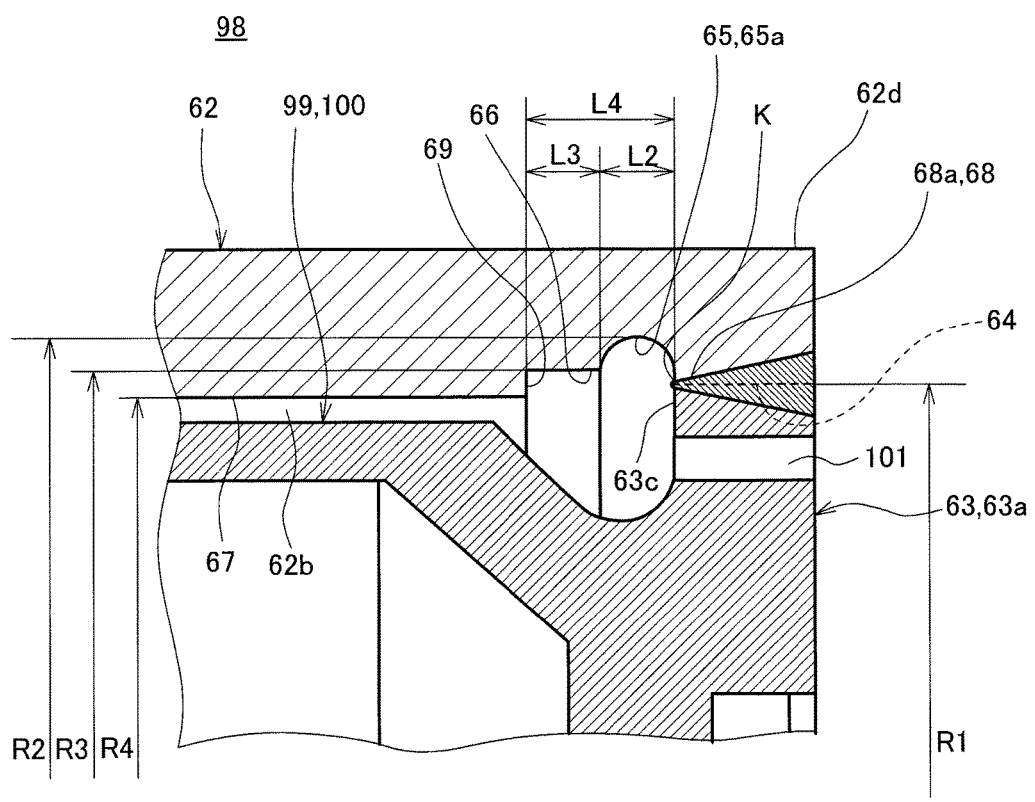
FIG. 15 is a partially enlarged sectional view of a portion of the piston shown in FIG. 14, the portion corresponding to the portion A of FIG. 1.

FIG. 14 is a longitudinal sectional view of a piston 98 included in the liquid-pressure rotating device according to Embodiment 12 of the present invention. FIG. 15 is a partially enlarged sectional view of a portion of the piston 98 shown in FIG. 14, the portion corresponding to the portion A of FIG. 1. The piston 98 of Embodiment 12 shown in FIGS. 14 and 15 is different from the piston 61 of Embodiment 1 shown in FIG. 1 regarding the liquid passage portion 70 and a liquid passage portion 99.

Other than the above, Embodiment 12 is the same in configuration as Embodiment 1 and acts in the same manner as Embodiment 1. Therefore, the same reference signs are used for the same components, and a repetition of the same explanation is avoided.

The liquid passage portion 99 included in the piston 98 of Embodiment 12 shown in FIG. 14 is provided such that the operating liquid contacts the inner surface of the peripheral wall main body portion 62. The liquid passage portion 99 is configured to cause outer surfaces of both end portions of the piston 98 to communicate with each other, that is, the liquid passage portion 99 is configured to cause the pressure receiving surface 63a of the lid portion 63 and the outer surface of the tip end portion (other end portion) 10a of the piston 10 to communicate with each other.

To be specific, as shown in FIGS. 14 and 15, the liquid passage portion 99 includes a tubular sealed hollow member 100 located at the hollow portion 62b of the peripheral wall main body portion 62. A right end portion of the hollow member 100 is coupled to the inner surface 63c of the lid portion 63. A tubular liquid passage is formed between the inner peripheral surface of the peripheral wall main body portion 62 and the outer peripheral surface of the hollow member 100, and a right end portion of the liquid passage communicates with an outside through a through hole 101 formed on the lid portion 63. A left end portion of the liquid passage communicates with an outside of the tip end portion 10a of the piston 98 through the communication hole 62c.

According to the piston 98 shown in FIG. 14, as with the piston 61 shown in FIG. 1, the frictional resistance between the tip end portion 10a of the piston 98 and the shoe 13 swingably fitting to the tip end portion 10a can be reduced by the operating liquid. Since the operating liquid flowing through the liquid passage portion 99 contacts the inner surface of the peripheral wall main body portion 62, the operating liquid can efficiently takes frictional heat generated by the sliding of the piston 98 on the piston chamber 9a. With this, cooling performance of a sliding surface (outer peripheral surface) of the piston 98 sliding on the piston chamber 9a can be improved, and the rotating speed of the liquid-pressure rotating device 72 can be improved.

Figure 16:
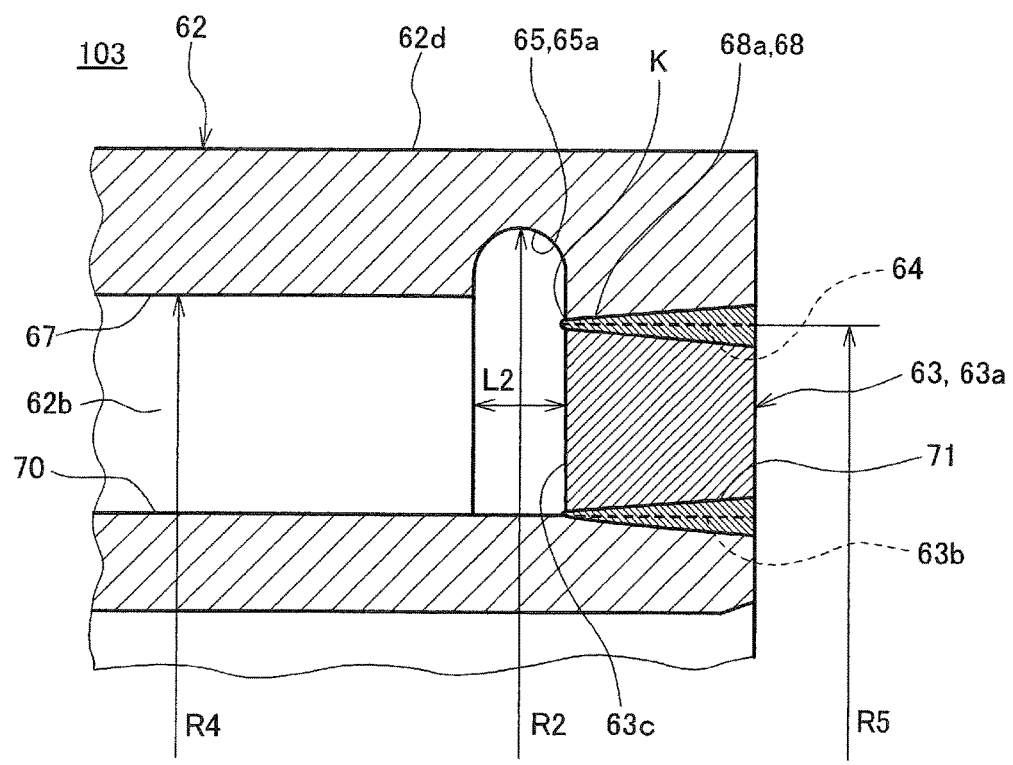
FIG. 16 is a partially enlarged sectional view of a portion of the piston included in the liquid-pressure rotating device according to Embodiment 13 of the present invention, the portion corresponding to the portion A of FIG. 1.

FIG. 16 is a partially enlarged sectional view of a portion of a piston 103 included in the liquid-pressure rotating device according to Embodiment 13 of the present invention, the portion corresponding to the portion A of FIG. 1. The piston 103 of Embodiment 13 shown in FIG. 16 and the piston 61 of Embodiment 1 shown in FIG. 2 are different from each other in that: the step portion 69 is formed in Embodiment 1 shown in FIG. 2, but the step portion 69 is not formed in Embodiment 13 shown in FIG. 16; and the radius R1 of the opening portion 64 of the peripheral wall main body portion 62 is larger than the radius R4 of the small-diameter portion 67 in Embodiment 1 shown in FIG. 2, but the radius R5 of the opening portion 64 of the peripheral wall main body portion 62 is smaller than the radius R4 of the small-diameter portion 67 in Embodiment 13 shown in FIG. 16.

Other than the above, Embodiment 13 is the same in configuration as Embodiment 1 and acts in the same manner as Embodiment 1. Therefore, the same reference signs are used for the same components, and a repetition of the same explanation is avoided.

In the piston 103 of Embodiment 13 shown in FIG. 16, the radius R5 of the opening portion 64 of the peripheral wall main body portion 62 is smaller than the radius R4 of the small-diameter portion 67. Manufacturing the peripheral wall main body portion 62 by the forging requires cost and labor. However, the peripheral wall main body portion 62 can be manufactured by the boring at lower cost with less labor.

The above embodiment has explained the swash plate axial piston motor or pump shown in FIG. 17 as one example of the liquid-pressure rotating device of the present invention. However, instead of this, the present invention is applicable to an inclined shaft axial piston motor or pump.

Each of the above embodiments has explained an example in which the present invention is applied to the piston including the liquid passage portion. However, the present invention is applicable to a piston not including the liquid passage portion.

In the above embodiments, each of the cross-sectional shapes of the stress reducing portion 65 and the like formed on the inner peripheral surface of the peripheral wall main body portion 62 and the cross-sectional shapes of the annular concave portion 91 and the like formed on the inner surface 63c of the lid portion 63 is the semi-circular shape, the semi-circular shape including the oblique surface portion, the substantially rectangular shape, the substantially right angled triangle, or the substantially trapezoid. However, each of these cross-sectional shapes may be any other shape, such as a circular-arc shape, a substantially polygonal shape, or a semi-elliptic shape.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

INDUSTRIAL APPLICABILITY

As above, the piston included in the liquid-pressure rotating device according to the present invention and the liquid-pressure rotating device according to the present invention have excellent effects of: reducing the weight of the piston; increasing the strength of the piston; and improving the energy conversion efficiency and maximum rotating speed of the liquid-pressure rotating device at which the piston is provided. Thus, the present invention is suitably applied to the piston included in the liquid-pressure rotating device and the liquid-pressure rotating device.

REFERENCE SIGNS LIST 1 swash plate liquid-pressure rotating device
2 casing main body
3 valve cover
3a supply passage
4 swash plate supporting portion
5 rotating shaft
6, 7 bearing
8 seal cover
9 cylinder block
9a piston chamber
9b oil passage
10 piston
10a tip end portion
10b hollow portion
12 swash plate
13 shoe
13a fitting concave portion
13b contact surface
14 retainer plate
22 concave surface
25 valve plate
25a supply port
25b discharge port
26a smooth surface
32 convex surface
41 shoe plate
44 tilt adjustment large-diameter piston
45 tilt adjustment small-diameter piston
47 tilt adjustment driving portion
61, 74, 75, 76, 81, 82, 83, 84, 85 piston
96, 97, 98, 103 piston
62 peripheral wall main body portion
62a tip end portion
62b hollow portion
62c communication hole
62d outer peripheral surface
63 lid portion
63a pressure receiving surface
63b center hole
63c inner surface
64 opening portion
65, 77, 78, 79, 86, 87, 88, 89, 90 stress reducing portion
65a inner peripheral surface
66 large-diameter concave portion
67 small-diameter portion
68, 71 welded portion
68a end portion of welded portion
69 step portion
70, 99 liquid passage portion
72 liquid-pressure rotating device
91, 92, 93, 94, 95 annular concave portion
100 hollow member
101 through hole of lid portion
G elevation-angle direction
M rotation axis
K coupled portion

The invention claimed is:

1. A piston included in a liquid-pressure rotating device in which a plurality of pistons including the piston are arranged at a cylinder block in a circumferential direction of the cylinder block, the cylinder block being configured to rotate together with a rotating shaft, the liquid-pressure rotating device being used as a pump or a motor,
the piston comprising:
a cylindrical peripheral wall main body portion including a hollow portion, an opening portion being formed at one end of the peripheral wall main body portion and communicating with the hollow portion;
a lid portion welded to an inner peripheral surface of the opening portion to seal the hollow portion and including an outer surface formed as a pressure receiving surface which receives liquid pressure;
a stress reducing portion formed on an inner peripheral surface of the peripheral wall main body portion, the inner peripheral surface of the peripheral wall main body portion being in contact with or close to an end portion of a welded portion formed between the opening portion and the lid portion, the end portion being located at a hollow portion side of the welded portion, the stress reducing portion being configured to reduce stress acting on the end portion of the welded portion;
a large-diameter concave portion formed on the inner peripheral surface of the peripheral wall main body portion so as to be located at a far side of the stress reducing portion away from the lid portion; and
a small-diameter portion formed on the inner peripheral surface of the peripheral wall main body portion so as to be located at a far side of the large-diameter concave portion away from the lid portion, wherein:
the stress reducing portion is an annular concave portion having a cross section through which a center line of the peripheral wall main body portion extends, the cross section having an arbitrary shape including a circular-arc shape or a polygonal shape; and
the large-diameter concave portion is larger in radius than the small-diameter portion and smaller in radius than the stress reducing portion.

2. The piston according to claim 1, further comprising an annular step portion projecting from the inner peripheral surface of the peripheral wall main body portion and opposing the end portion of the welded portion in a direction along a center line of the peripheral wall main body portion, the end portion being located at the hollow portion side of the welded portion, wherein
an interval between the step portion and the end portion, set such that when welding the lid portion to the opening portion, the end portion, is not coupled to the step portion through an extended welded portion.

3. The piston according to claim 1, wherein a tubular liquid passage portion is provided at a position of the piston to cause outer surfaces of both end portions of the piston to communicate with each other, a center line of the piston extending through the position.

4. The piston according to claim 1, further comprising a liquid passage portion provided such that an operating liquid contacts the inner peripheral surface of the peripheral wall main body portion, the liquid passage portion causing outer surfaces of both end portions of the piston to communicate with each other.

5. A liquid-pressure rotating device comprising the piston according to claim 1.

6. A piston included in a liquid-pressure rotating device in which a plurality of pistons including the piston are arranged at a cylinder block in a circumferential direction of the cylinder block, the cylinder block being configured to rotate together with a rotating shaft, the liquid-pressure rotating device being used as a pump or a motor,
the piston comprising:
a cylindrical peripheral wall main body portion including a hollow portion, an opening portion being formed at one end of the peripheral wall main body portion and communicating with the hollow portion;
a lid portion welded to an inner peripheral surface of the opening portion to seal the hollow portion and including an outer surface formed as a pressure receiving surface which receives liquid pressure; and
a stress reducing portion provided on an inner surface of the lid portion, the inner surface being in contact with or close to an end portion of a welded portion formed between the opening portion and the lid portion, the inner surface being located at a hollow portion side of the lid portion, the stress reducing portion being configured to reduce stress acting on the end portion of the welded portion, wherein:
the stress reducing portion is an annular thin portion projecting from an outer peripheral portion of the lid portion toward the hollow portion, the outer peripheral portion of the lid portion being located at the hollow portion side of the lid portion,
the welded portion is formed between an outer peripheral surface of the lid portion including the thin portion and an inner peripheral surface of the peripheral wall main body portion,
the stress reducing portion is formed by an annular concave portion formed at the hollow portion side of the lid portion, and
an axial thickness of the thin portion of the lid portion is larger than a minimum axial thickness of the annular concave portion.

7. The piston according to claim 6, wherein the annular concave portion has a cross section through which a center line of the lid portion extends, the cross section having a circular-arc shape or a polygonal shape.

8. A piston included in a liquid-pressure rotating device in which a plurality of pistons including the piston are arranged at a cylinder block in a circumferential direction of the cylinder block, the cylinder block being configured to rotate together with a rotating shaft, the liquid-pressure rotating device being used as a pump or a motor,
the piston comprising:
a cylindrical peripheral wall main body portion including a hollow portion, an opening portion being formed at one end of the peripheral wall main body portion and communicating with the hollow portion;
a lid portion welded to an inner peripheral surface of the opening portion to seal the hollow portion and including an outer surface formed as a pressure receiving surface which receives liquid pressure; and
a stress reducing portion formed on an inner peripheral surface of the peripheral wall main body portion, the inner peripheral surface of the peripheral wall main body portion being in contact with or close to an end portion of a welded portion formed between the opening portion and the lid portion, the end portion being located at a hollow portion side of the welded portion, the stress reducing portion being configured to reduce stress acting on the end portion of the welded portion, wherein:
the stress reducing portion is an annular concave portion having a cross section through which a center line of the peripheral wall main body portion extends, the cross section having an arbitrary shape including a circular-arc shape or a polygonal shape; and
the stress reducing portion extends from a position corresponding to an inner surface of the lid portion in a direction away from the lid portion, the inner surface being located at a hollow portion side of the lid portion.

* * * * *